(12) United States Patent
Nakamura

(10) Patent No.: US 10,351,134 B2
(45) Date of Patent: Jul. 16, 2019

(54) TRAVEL CONTROL DEVICE AND TRAVEL CONTROL METHOD

(71) Applicant: Nissan Motor Co., Ltd., Yokohama-shi, Kanagawa (JP)

(72) Inventor: Masahide Nakamura, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 225 days.

(21) Appl. No.: 15/512,827

(22) PCT Filed: Sep. 29, 2014

(86) PCT No.: PCT/JP2014/075883
§ 371 (c)(1),
(2) Date: Mar. 20, 2017

(87) PCT Pub. No.: WO2016/051460
PCT Pub. Date: Apr. 7, 2016

(65) Prior Publication Data
US 2018/0326981 A1    Nov. 15, 2018

(51) Int. Cl.
*B60W 30/095* (2012.01)
*B60W 30/09* (2012.01)
(Continued)

(52) U.S. Cl.
CPC ........ *B60W 30/0956* (2013.01); *B60W 10/04* (2013.01); *B60W 10/18* (2013.01);
(Continued)

(58) Field of Classification Search
CPC .. B60W 30/0956; B60W 10/04; B60W 10/20; B60W 30/143; B60W 30/0953;
(Continued)

(56) References Cited

U.S. PATENT DOCUMENTS 6,703,944 B1 * 3/2004 Obradovich ........ B60R 16/0231
340/903
8,106,755 B1 * 1/2012 Knox .................... B60Q 9/008
340/435

(Continued)

FOREIGN PATENT DOCUMENTS

JP    2005138782 A    6/2005
JP    2006330980 A    12/2006
(Continued)

*Primary Examiner* — Muhammad Shafi
(74) *Attorney, Agent, or Firm* — Young Basile Hanlon & MacFarlane, P.C.

(57) ABSTRACT

A travel control device executes a first information acquisition function to acquire subject vehicle information including the position of a subject vehicle, a second information acquisition function to acquire object information including the position of an avoidance object, a setting function to set a detection area for detecting the avoidance object, the detection area set in accordance with the position of the subject vehicle, and a control function for controlling travel of the subject vehicle when it is detected that the avoidance object exists within the detection area. The setting function is used to extend the detection area rearward from the subject vehicle when it is detected that the avoidance object located behind the subject vehicle exists within the detection area and extend the detection area frontward from the subject vehicle when it is detected that the avoidance object located ahead of the subject vehicle exists within the detection area.

14 Claims, 9 Drawing Sheets

(51) Int. Cl.
*B60W 30/12* (2006.01)
*B60W 50/14* (2012.01)
*B60W 10/04* (2006.01)
*B60W 10/18* (2012.01)
*B60W 10/20* (2006.01)
*B60W 30/14* (2006.01)
*B60W 30/16* (2012.01)
*G08G 1/16* (2006.01)
*B60Q 9/00* (2006.01)

(52) U.S. Cl.
CPC ............ *B60W 10/20* (2013.01); *B60W 30/09* (2013.01); *B60W 30/0953* (2013.01); *B60W 30/12* (2013.01); *B60W 30/143* (2013.01); *B60W 30/16* (2013.01); *B60W 50/14* (2013.01); *G08G 1/165* (2013.01); *G08G 1/166* (2013.01); *G08G 1/167* (2013.01); *B60Q 9/008* (2013.01); *B60W 2050/143* (2013.01); *B60W 2050/146* (2013.01); *B60W 2420/42* (2013.01); *B60W 2520/10* (2013.01); *B60W 2520/105* (2013.01); *B60W 2520/14* (2013.01); *B60W 2550/30* (2013.01); *B60W 2550/402* (2013.01)

(58) Field of Classification Search
CPC ...... B60W 50/14; B60W 10/18; B60W 30/16; B60W 30/09; B60W 30/12; B60W 2520/10; B60W 2520/105; B60W 2520/14; B60W 2550/30; B60W 2050/146; B60W 2050/143; B60W 2550/402; B60W 2420/42; G08G 1/165; G08G 1/167; G08G 1/166; B60Q 9/008
USPC ....................................................... 701/301
See application file for complete search history.

(56) References Cited

U.S. PATENT DOCUMENTS

| | | | |
|---|---|---|---|
| 9,523,984 B1* | 12/2016 | Herbach | B62D 15/025 |
| 2005/0171675 A1 | 8/2005 | Sawamoto et al. | |
| 2010/0228419 A1* | 9/2010 | Lee | B60W 30/0953 |
| | | | 701/25 |
| 2011/0190972 A1* | 8/2011 | Timmons | G01C 21/34 |
| | | | 701/31.4 |
| 2016/0046232 A1* | 2/2016 | Guy | B60Q 1/525 |
| | | | 340/436 |

FOREIGN PATENT DOCUMENTS

| | | | |
|---|---|---|---|
| JP | 2010235072 A | | 10/2010 |
| JP | 2012011947 | * | 1/2012 |
| JP | 2012011947 A | | 1/2012 |
| JP | 2012234410 A | | 11/2012 |
| JP | 2013091401 A | | 5/2013 |

* cited by examiner

FIG. 4A
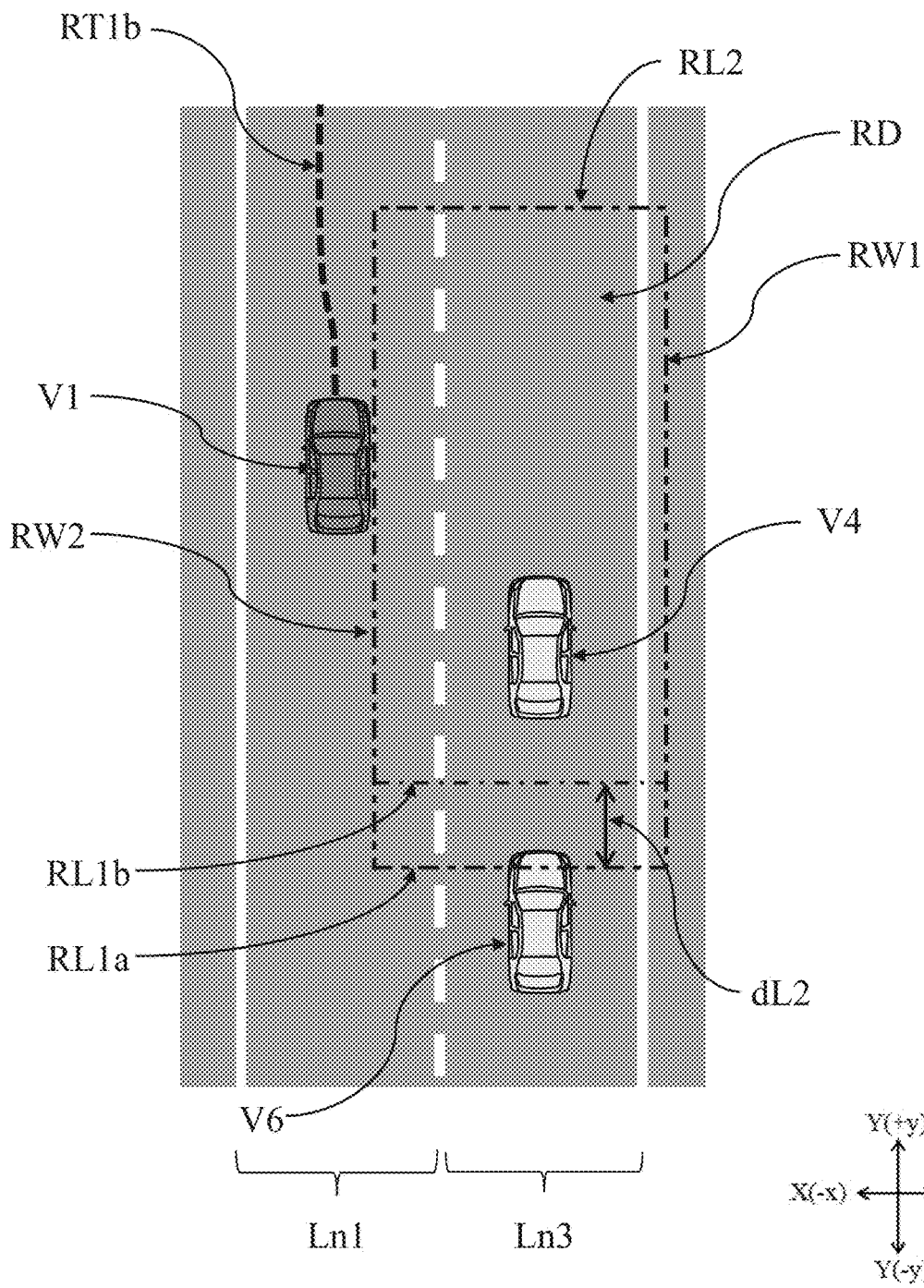
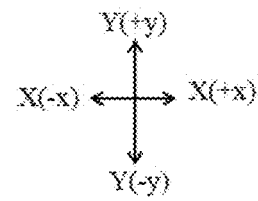

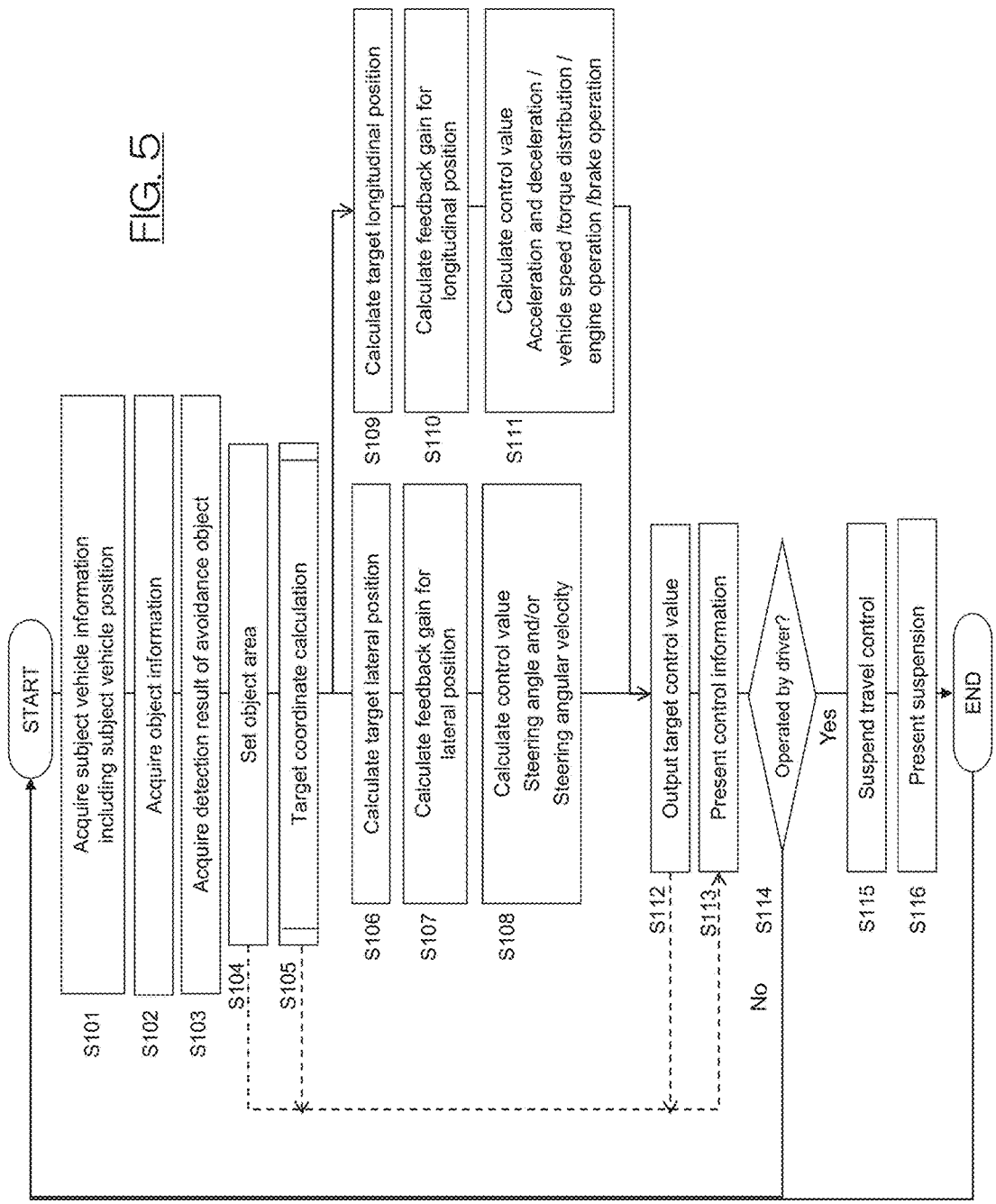

TRAVEL CONTROL DEVICE AND TRAVEL CONTROL METHOD

TECHNICAL FIELD

The present invention relates to a travel control device and travel control method that control travel of a vehicle.

BACKGROUND

A travel control device is known in which, when another vehicle is detected at the left side of a subject vehicle, the travel position of the subject vehicle is set at the right side from a normal position and when another vehicle is detected at the right side of the subject vehicle, the travel position of the subject vehicle is set at the left side from the normal position (See JP2013-091401A).

In the above technique, however, if another vehicle comes close to the subject vehicle and comes away from the subject vehicle while the subject vehicle and the other vehicle are traveling side by side, detection and non-detection of the other vehicle are repeated, which may cause hunting in control when performing travel control for the subject vehicle to the other vehicle.

SUMMARY

A problem to be solved by the present invention is to provide a travel control device and a travel control method in which the hunting in control can be suppressed when controlling travel of the subject vehicle.

The present invention solves the above problem as follows. When travel of a subject vehicle is controlled, a detection area for detecting presence or absence of an avoidance object such as another vehicle is extended rearward upon detection of an avoidance object existing within the detection area.

According to the present invention, when travel of the subject vehicle is controlled, the detection area is extended rearward upon detection of an avoidance object existing within the detection area and it is thereby possible to suppress the repetition of detection and non-detection of the avoidance object within the detection area before being extended. Consequently, the hunting in travel control is suppressed and the uncomfortable feeling given to the passengers can be mitigated.

DETAILED DESCRIPTION OF THE DRAWINGS

FIG. 4A is a plan view for describing a process to contract the detection area when another avoidance object exists further behind the avoidance object existing behind the subject vehicle;

FIG. 5 is a flowchart illustrating a control procedure for avoiding an avoidance object.

DETAILED DESCRIPTION OF THE EMBODIMENTS

Hereinafter, one or more embodiments of the present invention will be describe d with reference to the drawings. In the embodiments, the present invention will be described by exemplifying examples in which the travel control device for a vehicle according to the present invention is applied to a travel control system equipped in a vehicle. Embodiments of the travel control device according to the present invention are not limited and can also be applied to a portable terminal device that can exchange information with the side of a vehicle. The travel control device, travel control system and portable terminal device are each a computer that executes a calculation process.

Figure 1:
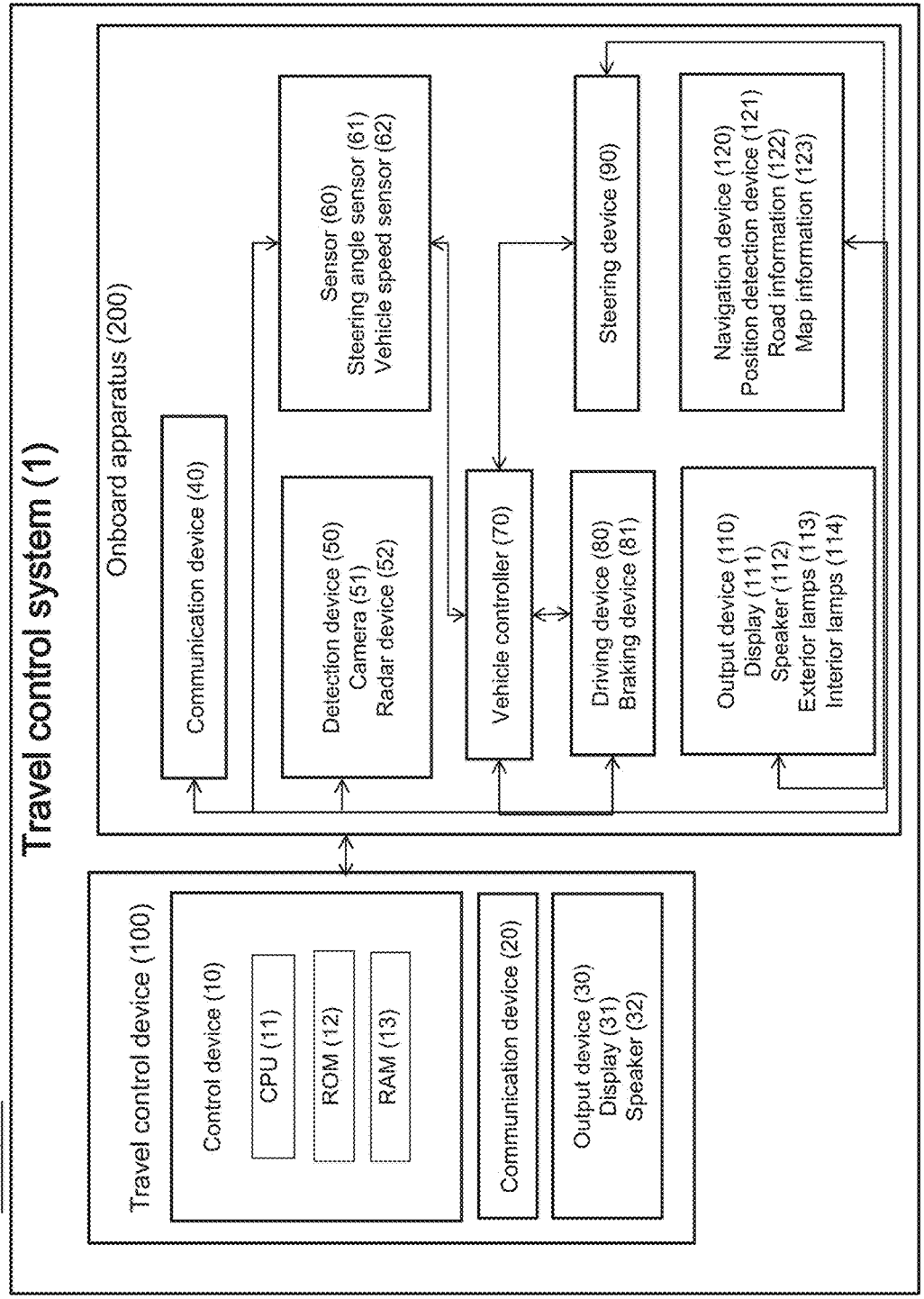
FIG. 1 is a block diagram of a travel control system according to one or more embodiments of the present invention.

FIG. 1 is a diagram illustrating a block configuration of a travel control system 1 according to one or more embodiments of the present invention. The travel control system 1 is equipped in a vehicle and comprises a travel control device 100 and an onboard apparatus 200.

The travel control device 100 according to one or more embodiments of the present invention has a lane departure prevention function (lane keep support function) to recognize a lane in which the subject vehicle is traveling and control the moving behavior of the subject vehicle so as to maintain a relationship between the position of a lane marker of the lane and the position of the subject vehicle. The travel control device 100 according to one or more embodiments of the present invention controls the moving behavior of the subject vehicle so that the subject vehicle travels along the center of a lane. The travel control device 100 may also control the moving behavior of the subject vehicle so that the distance from the lane marker of a lane to the subject vehicle along the road width direction falls within a predetermined range. The lane marker according to one or more embodiments of the present invention is not limited, provided that it has a function to define a lane. The lane marker may be a line drawn on a road surface, a planting that exists between lanes, or a road structure that exists at the side of a road shoulder of a lane, such as a guardrail, curbstone, sidewalk, and exclusive road for two wheels. The lane marker may also be a fixed structure that exists at the side of a road shoulder of a lane, such as an advertising display, traffic sign, store, and roadside tree. The scheme of detecting such lane markers is not limited and various schemes such as pattern matching can be used which are known at the time of filing of the present application.

The travel control device 100 and the onboard apparatus 200 have communication devices 20 and 40, respectively, and exchange information with each other via wired or wireless communication.

The onboard apparatus 200 will first be described.

The onboard apparatus 200 according to one or more embodiments of the present invention comprises a detection device 50, sensor 60, vehicle controller 70, driving device 80, steering device 90, output device 110, and navigation device 120. These devices which constitute the onboard apparatus 200 are connected to one another via a CAN (Controller Area Network) or other in-vehicle LAN to mutually exchange information.

These devices which constitute the onboard apparatus 200 will each be described below.

The detection device 50 detects the existence of an avoidance object which the subject vehicle should avoid and its existence position. The detection device 50 according to one or more embodiments of the present invention includes, but is not limited to including, a camera 51. The camera 51 according to one or more embodiments of the present invention is, for example, a camera that comprises an imaging element such as CCD. The camera 51 according to one or more embodiments of the present invention, which is installed in the subject vehicle, captures images around the subject vehicle and acquires data of an image that includes an avoidance object existing around the subject vehicle. Specific examples and the like of the "avoidance object" described in one or more embodiments of the present invention will be described later.

The camera 51 according to one or more embodiments of the present invention is attached, for example, to the rear or side of the subject vehicle and can capture the image of an area just behind the subject vehicle V1, the image of an area of a lane adjacent to the lane in which the subject vehicle V1 travels, and other necessary images.

The detection device 50 extracts the position of an avoidance object that travels behind the subject vehicle in the lane in which the subject vehicle travels, such as by data analysis on images captured by the camera 51. The position of the avoidance object includes a position relative to lane markers that define a lane.

In addition, the detection device 50 calculates the distance from the subject vehicle to an avoidance object on the basis of the position of the avoidance object relative to the subject vehicle. Further, the detection device 50 may also calculate a relative speed and relative acceleration between the subject vehicle and the avoidance object from a variation over time of the position of the avoidance object. As for a process to calculate the positional relationship between the subject vehicle and another vehicle based on the image data and a process to calculate the speed information based on the amount of variation over time of the positional relationship, schemes known at the time of filing of the present application can be appropriately used.

In addition or alternatively, the detection device 50 may analyze the image data and identify the classification of the avoidance object on the basis of the analysis result. The detection device 50 can use a pattern matching technique or the like to identify whether the avoidance object included in the image data is a vehicle, pedestrian, traffic sign, or other object.

The detection device 50 according to one or more embodiments of the present invention may include a radar device 52 as substitute for the above-described camera 51 or together with the camera 51 to detect the position and the like of the avoidance object. Examples of the radar device 52 may be those, such as millimeter-wave radar, laser radar and ultrasonic radar, which are known at the time of filing of the present application.

In one or more embodiments of the present invention, information including at least the position of an avoidance object detected by the detection device 50 is sent to the side of the travel control device 100. The information transmitted from the detection device 50 to the travel control device 100 includes, in addition to the information on the position of an avoidance object, speed information and acceleration information of the avoidance object, information on the classification of the avoidance object, and information on the vehicle type and the like when the avoidance object is a vehicle.

The "avoidance object" in one or more embodiments of the present invention refers to an object which the subject vehicle should avoid to travel (so that the subject vehicle does not excessively come close to the object). The detection device 50 detects an object having a positional relationship with the subject vehicle as the avoidance object. For example, the detection device 50 can detect, as the avoidance object, an object that exists on a travel lane for the subject vehicle and within a predetermined distance from the subject vehicle (the travel lane for the subject vehicle in this case may be substituted by an adjacent lane or oncoming lane to the travel lane for the subject vehicle, as will be understood).

The avoidance object in one or more embodiments of the present invention may be a moving object that exists around the subject vehicle and examples thereof include other vehicles traveling and pedestrians walking. Examples of such other vehicles include two-wheel vehicles, such as bicycles and motorbikes; large-sized vehicles, such as buses and trucks; special-purpose vehicles, such as trailers and crane cars; emergency vehicles, such as ambulance cars, fire truck and police cars; and standard-sized cars.

The sensor 60 according to one or more embodiments of the present invention comprises a steering angle sensor 61 and vehicle speed sensor 62. The steering angle sensor 61 detects steering information regarding the steering, such as a steering amount, steering speed and steering acceleration of the subject vehicle, and sends the steering information to the vehicle controller 70 and the travel control device 100. The vehicle speed sensor 62 detects a speed and acceleration of the subject vehicle and sends them to the vehicle controller 70 and the travel control device 100.

The vehicle controller 70 according to one or more embodiments of the present invention is an onboard computer, such as an engine control unit (ECU), and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both the electric motor and internal combustion engine as the traveling drive sources. Examples of the electric car and hybrid car having an electric motor as the traveling drive source include a type in which the power source for the motor is a secondary battery and a type in which the power source for the motor is a fuel cell.

The driving device 80 according to one or more embodiments of the present invention comprises a drive mechanism of the subject vehicle V1. The drive mechanism includes an electric motor and/or internal-combustion engine as the above-described traveling drive source, a power transmission device including a drive shaft and automatic transmission that transmit the output of the traveling drive source to the drive wheels, and a braking device 81 that brakes wheels. The driving device 80 generates respective control signals for these components of the drive mechanism and executes the travel control including acceleration and deceleration of the vehicle. These control signals for the drive mechanism are generated on the basis of input signals by an accelerator operation and brake operation of the driver and control signals acquired from the vehicle controller 70 or from the travel control device 100. Command information may be sent to the driving device 80, which can thereby automatically perform the travel control including acceleration and deceleration of the vehicle. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention has a steering actuator. The steering actuator includes a motor and other necessary components attached to the steering column shaft. The steering device 90 executes the steering control for the vehicle on the basis of a control signal acquired from the vehicle controller 70 or an input signal by the steering operation of the driver. The vehicle controller 70 sends command information, including a steering amount, to the steering device 90 thereby to execute the steering control. In addition or alternatively, the travel control device 100 may control a braking quantity for each wheel of the vehicle thereby to execute the steering control. In this case, the vehicle controller 70 sends command information, including the braking quantity for each wheel, to the braking device 81 thereby to execute the steering control for the vehicle.

The navigation device 120 according to one or more embodiments of the present invention calculates a route from the current position of the subject vehicle to a destination and outputs route guidance information via the output device 110 which will be described later. The navigation device 120 has a position detection device 121, road information 122 including a road type, road width, road shape and others, and map information 123 in which the road information 122 is associated with each point. The position detection device 121 according to one or more embodiments of the present invention is responsible to the Global Positioning System (GPS) and detects a position (latitude and longitude) at which the vehicle is traveling. The navigation device 120 specifies a road link on which the subject vehicle travels, on the basis of the current position of the subject vehicle detected by the position detection device 121. The road information 122 according to one or more embodiments of the present invention is stored such that identification information for each road link is associated with the road type, road width, road shape, whether or not the overtaking is permitted (whether or not the lane change to an adjacent lane is permitted), and other road-related information. The navigation device 120 refers to the road information 122 to acquire the information regarding a road to which the road link on which the subject vehicle travels belongs, and sends the information to the travel control device 100. The road type, road width and road shape of a road on which the subject vehicle travels are used in a travel control process to calculate a target route on which the subject vehicle is to travel.

The output device 110 according to one or more embodiments of the present invention outputs various information items regarding the travel assistance to the user or to passengers of surrounding vehicles. In one or more embodiments of the present invention, the output device 110 outputs one or more information items among information in accordance with the position of an avoidance object, information in accordance with the location of a detection area which will be described later, and information regarding the travel control for the subject vehicle V1 by the travel control device 100. As will be described later, the detection area is an area that is set around the subject vehicle V1 for detecting an avoidance object. In one or more embodiments of the present invention, when it is detected that an avoidance object exists within the detection area, the travel control device 100 performs control of the subject vehicle V1.

The output device 110 according to one or more embodiments of the present invention includes a display 111, speaker 112, exterior lamps 113, and interior lamps 114. The exterior lamps 113 include headlights, winker lamps, and brake lamps. The interior lamps 114 include lighting displays of indicators and lighting displays of the display 111 as well as lamps provided at the steering and lamps provided around the steering. The output device 110 according to one or more embodiments of the present invention may output various information items regarding the travel assistance to external devices such as Intelligent Transport Systems (ITS) via the communication device 40. The external devices such as Intelligent Transport Systems use the information regarding the travel assistance, including the speed of the vehicle, steering information, traveling route, etc., for the traffic management of a plurality of vehicles.

Specific forms of outputting information will be described with reference to an example in which another vehicle traveling as the avoidance object exists at the forward left side of the subject vehicle traveling.

The output device 110 provides passengers of the subject vehicle with a direction and/or position in which another vehicle exists, as the information in accordance with the position of the avoidance object. The display 111 displays the direction and/or position in which another vehicle exists in a form that can be visually recognized. The speaker 112 reads out a text that informs the direction and/or position in which another vehicle exists, such as "Please be advised another vehicle exists at the forward left side." Among lamps provided as the exterior lamps 113 at left and right door mirrors, only the left-side lamp may be blinked to inform the subject vehicle's passengers that another vehicle exists at the forward left side. Among lamps provided as the interior lamps 114 at the left and right in the vicinity of the steering, only the left-side lamp may be blinked to inform the passengers that another vehicle exists at the forward left side.

The direction and/or location in which a detection area is set can be output as the information in accordance with the location of the detection area to inform the subject vehicle's passengers or other vehicles' passengers of such information via the display 111, speaker 112, exterior lamps 113, and/or interior lamps 114.

Furthermore, the subject vehicle's passengers or other vehicles' passengers may be preliminarily informed that the steering operation and/or acceleration or deceleration will be performed, as the information regarding travel control for the subject vehicle V1 by the travel control device 100, via the display 111, speaker 112, exterior lamps 113 and/or interior lamps 114.

Thus, by outputting the information regarding travel control for the subject vehicle V1, passengers of the subject vehicle and/or other vehicles can be preliminarily informed of the behavior of the subject vehicle. The output device 110 may output the above-described information to external devices, such as the Intelligent Transport Systems (ITS), via the communication device 20. This allows the passengers of the subject vehicle and/or the passengers of other vehicles to respond to the behavior of the subject vehicle which is under the travel control.

The travel control device 100 according to one or more embodiments of the present invention will then be described.

As illustrated in FIG. 1, the travel control device 100 according to one or more embodiments of the present invention comprises a control device 10, communication device 20, and output device 30. The communication device 20 exchanges information with the onboard apparatus 200. The output device 30 has a similar function to that of the previously-described output device 110 of the onboard apparatus 200. When the travel control device 100 is a computer that can be carried by a passenger, the travel control device 100 may output, to each device, command information for controlling the blinking of the exterior lamps 113 and/or interior lamps 114 of the onboard apparatus 200.

In the travel control device 100 according to one or more embodiments of the present invention, the control device 10 plans a target route for the subject vehicle V1 to travel in a lane on a road and allows the subject vehicle V1 to travel on the target route thereby to perform travel control for the subject vehicle V1. The target route is appropriately updated by the control device 10 while the subject vehicle V1 is traveling.

The control device 10 of the travel control device 100 is a computer comprising: a ROM (Read Only Memory) 12 that stores programs for presenting different travel control information in accordance with the degree of proximity between the subject vehicle and another vehicle; a CPU (Central Processing Unit) 11 as an operation circuit that executes the programs stored in the ROM 12 to function as the travel control device 100; and a RANI (Random Access Memory) 13 that functions as an accessible storage device.

The control device 10 of the travel control device 100 according to one or more embodiments of the present invention has a subject vehicle information acquisition function, object information acquisition function, detection area setting function, route planning function, control function, and presentation function. The control device 10 according to one or more embodiments of the present invention executes each function by cooperation of software for realizing the above functions and the above-described hardware.

Each function of the travel control device 100 according to one or more embodiments of the present invention will be described below.

First, the subject vehicle information acquisition function of the control device 10 will be described. The control device 10 acquires information that includes the position of the subject vehicle as the subject vehicle information. The position of the subject vehicle can be acquired by the position detection device 121 of the navigation device 120. The above subject vehicle information further includes the vehicle speed and acceleration of the subject vehicle. The control device 10 acquires the speed of the subject vehicle from the vehicle speed sensor 62. The speed of the subject vehicle can also be acquired on the basis of a variation over time of the position of the subject vehicle. The acceleration of the subject vehicle can be obtained from the speed of the subject vehicle.

The object information acquisition function of the control device 10 will be described. The control device 10 acquires object information that includes the position of an avoidance object which the subject vehicle should avoid. The control device 10 acquires information that includes the position of the avoidance object detected by the detection device 50, as the object information. The above object information further includes a relative position, relative speed and relative acceleration of the avoidance object.

When the avoidance object is another vehicle and this other vehicle and the subject vehicle are capable of inter-vehicle communication (communication in which a plurality of vehicles can directly communicate with one another without using a server or the like), the control device 10 of the subject vehicle may acquire, as the object information, the vehicle speed and acceleration of the other vehicle detected by the vehicle speed sensor of the other vehicle. As will be understood, the control device 10 can also acquire avoidance information that includes the position, speed and acceleration of the other vehicle from external devices, such as the Intelligent Transport Systems.

The detection area setting function and route planning function of the control device 10 will be described. In one or more embodiments of the present invention, the control device 10 uses the detection area setting function to set a detection area for detecting an avoidance object. Then, while another vehicle exists within the detection area, the control device 10 uses the route planning function to plan a target route on which the subject vehicle V1 is to travel, on the basis of the position of another vehicle, as will be described later. In a method of planning a target route RT1, the control device 10 can obtain the target route RT1, for example, by calculating one or more target coordinates and connecting the current position of the subject vehicle V1 and the target coordinates.

Figure 2:
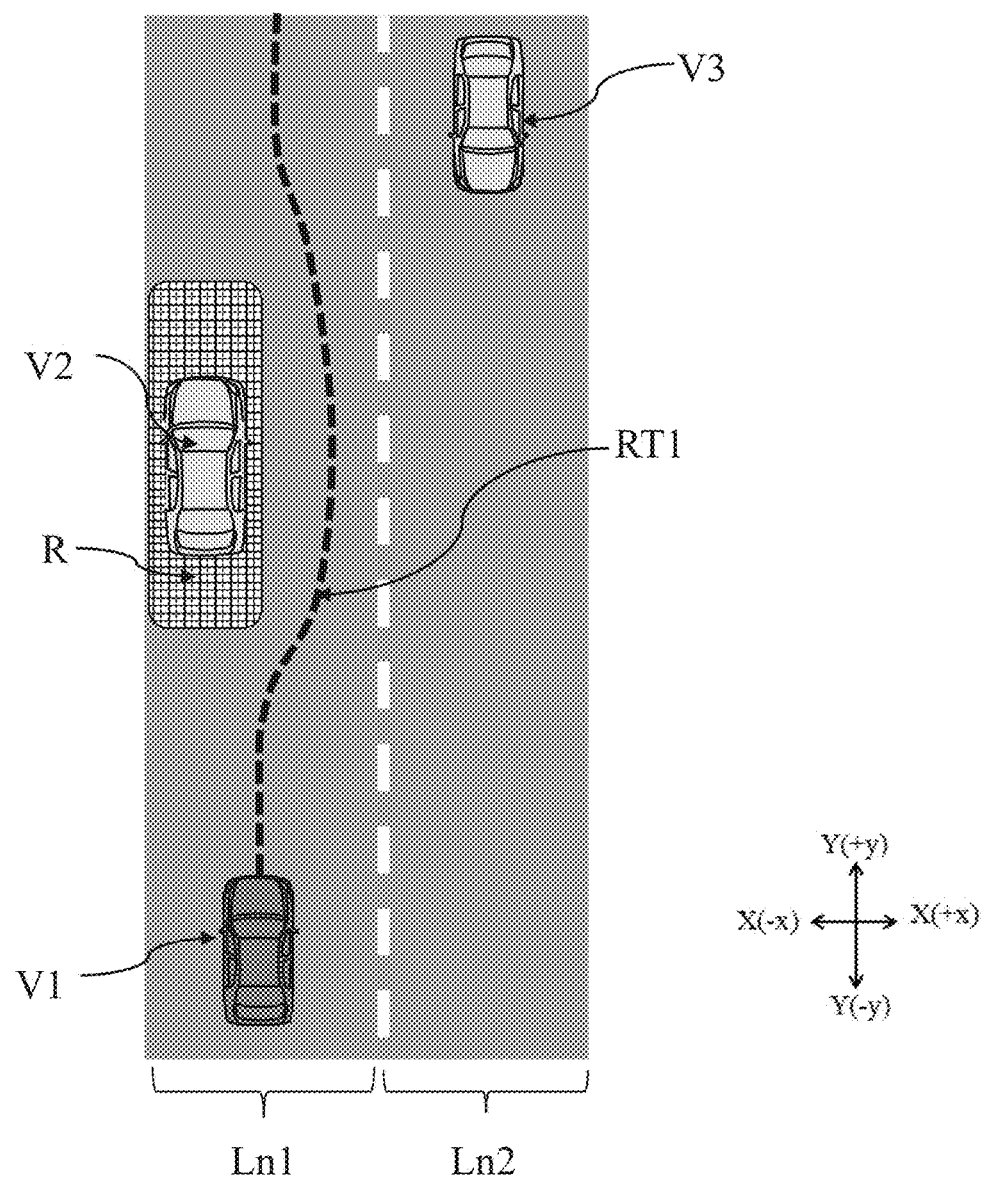
FIG. 2 is a plan view for describing a process to plan a target route on the basis of an object area.

When detecting that an avoidance object exists around the subject vehicle V1, the control device 10 according to one or more embodiments of the present invention plans the target route RT1 which allows the subject vehicle V1 to avoid the avoidance object. During this planning, the control device 10 may plan the target route RT1 in accordance with the position of the avoidance object or may also set, as illustrated in FIG. 2, a object area R for the avoidance object (another vehicle V2 illustrated in FIG. 2) and plan the target route RT1 so as to avoid the set object area R (i.e. so as to pass by the side of the object area R). FIG. 2 is a view when viewing from above a scene of detecting another vehicle V2 that is parked at the left-side road shoulder of the travel lane Ln1 for the subject vehicle. The detected other vehicle V2 exists in the travel lane Ln1 for the subject vehicle V1 and is therefore an avoidance object which the subject vehicle V1 should avoid because the other vehicle V2 will interfere the subject vehicle V1 traveling straight ahead.

In one or more embodiments of the present invention, the object area set for the avoidance object may be set with consideration for avoiding a state in which the distance between the subject vehicle V1 and the avoidance object becomes less than a predetermined value so that they come close to each other or come into contact with each other, or may also be set with consideration for the subject vehicle V1 and the avoidance object to maintain an appropriate distance. In one or more embodiments of the present invention, the object area may have a shape that analogously follows the outer shape of an avoidance object or may also have a shape that includes an avoidance object. The control device 10 may set the border of the object area as a shape that analogously follows the outer shape of an avoidance object or as a shape that includes an avoidance object, such as a circular shape, elliptical shape, rectangular shape, and polygonal shape. The object area may be set narrow such that the border of the object area is separate from the surface (outer edge) of an avoidance object by less than a predetermined distance (A) or may also be set wide such that the border of the object area is separate from the avoidance object by a predetermined distance B (B>A) or more.

In one or more embodiments of the present invention, the control device 10 may calculate the target route RT such that the subject vehicle V1 does not enter the object area which is set for an avoidance object, may calculate the target route RT such that an area in which the object area and a possible existence area of the subject vehicle V1 overlap each other is less than a predetermined value, may calculate a sequence of positions separate from the border of the object area by a predetermined distance as the target route RT, or may calculate the border itself of the object area as the target route RT. As previously described, the object area is set such that the distance between the subject vehicle V1 and the avoidance object does not become less than a predetermined value or such that the distance between the subject vehicle V1 and the avoidance object is maintained at a predetermined threshold. Consequently, the target route RT is also planned at a location at which the distance between the subject vehicle V1 and the avoidance object does not become less than the predetermined value or at a location at which the distance between the subject vehicle V1 and the avoidance object is maintained at the predetermined threshold.

In the example illustrated in FIG. 2, an exemplary case is described in which the other vehicle V2 as the avoidance object is a parked vehicle that exists in the travel lane Ln1 for the subject vehicle, but also in cases where the avoidance object exists in a lane other than the travel lane Ln1 for the subject vehicle or where the avoidance object is traveling, the target route RT1 is planned for passing by the avoidance object. In one or more embodiments of the present invention, the control device 10 uses the control function, which will be described later, to allow the subject vehicle V1 to travel on the target route RT1 which is planned in the above manner.

When, as illustrated in FIG. 2, there is another vehicle V3 traveling in the opposite direction in an oncoming lane Ln2 to the travel lane Ln1 for the subject vehicle V1, the other vehicle V3 is also detected as an avoidance object. Although not illustrated in the figure, when the other vehicle V3 is detected as an avoidance object, an object area R can be set within a region that includes the other vehicle V3, in the same manner. In this case, the control device 10 determines whether or not a target route RT1 can be planned which allows the subject vehicle to pass by the oncoming other vehicle V3 while avoiding the other vehicle V2. If a determination is made that a target route RT1 cannot be planned which allows the subject vehicle V1 to pass by the oncoming other vehicle V3 while avoiding the other vehicle V2, the control device 10 commands the vehicle controller 70 of the travel control device 100 to control the braking quantity of each wheel of the subject vehicle V1 using the braking device 81 of the driving device 80 and makes the subject vehicle V1 stop short of the other vehicle V2 (at the side of −y) and wait until the other vehicle V3 passes.

As the above, in one or more embodiments of the present invention, the control device 10 uses the route planning function to plan the target route RT1.

Figure 3A:
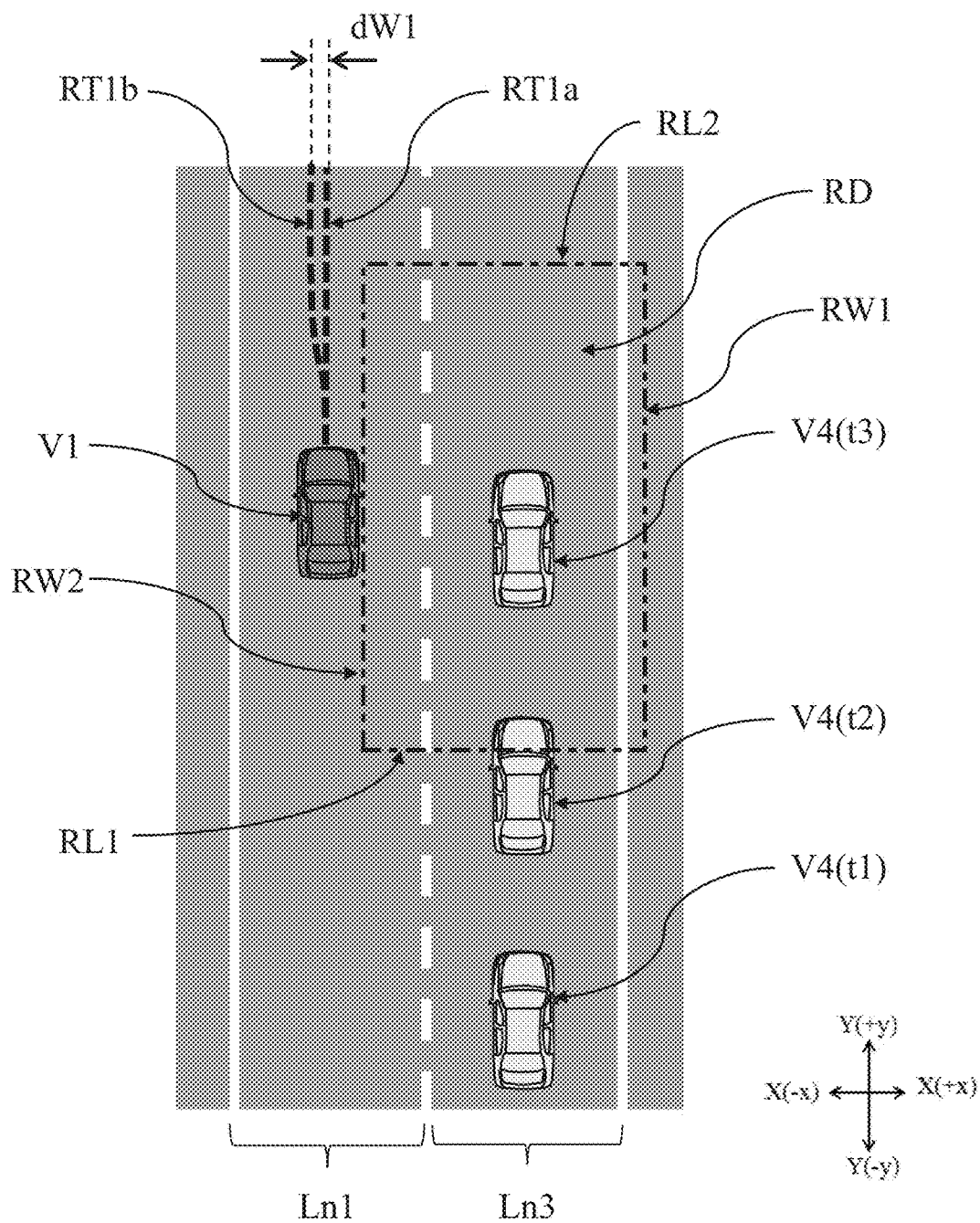
FIG. 3A is a plan view for describing a detection area for detecting an avoidance object.

The control device 10 according to one or more embodiments of the present invention uses the route planning function to set a detection area RD around the subject vehicle V1, as illustrated in FIG. 3A, for detecting an avoidance object. FIG. 3A is a view illustrating an example of a scheme to set the detection area RD. Specifically, FIG. 3A is a view, viewed from above, of a scene in which another vehicle V4 is traveling in the right-side adjacent lane Ln3 to the travel lane Ln1 when the control device 10 controls the subject vehicle V1 to travel on a target route RT1a.

The length of the detection area RD illustrated in FIG. 3A is defined by longitudinal end parts RL1 and RL2. Among the longitudinal end parts RL1 and RL2, the longitudinal end part located behind the subject vehicle V1 is referred to as a first end part RL1. Among the longitudinal end parts RL1 and RL2, the longitudinal end part located ahead of the subject vehicle V1 is referred to as a second end part RL2. The width of the detection area RD illustrated in FIG. 3A is defined by lateral end parts RW1 and RW2. Among the lateral end parts RW1 and RW2, the lateral end part located farther from the subject vehicle V1 is referred to as a first lateral end part RW1. Among the lateral end parts RW1 and RW2, the lateral end part located nearer to the subject vehicle V1 is referred to as a second lateral end part RW2.

In FIG. 3A, V4(t1) to V4(t3) represent relative positions of the other vehicle V4 to the subject vehicle V1 at time points t1 to t3.

Figure 3B:
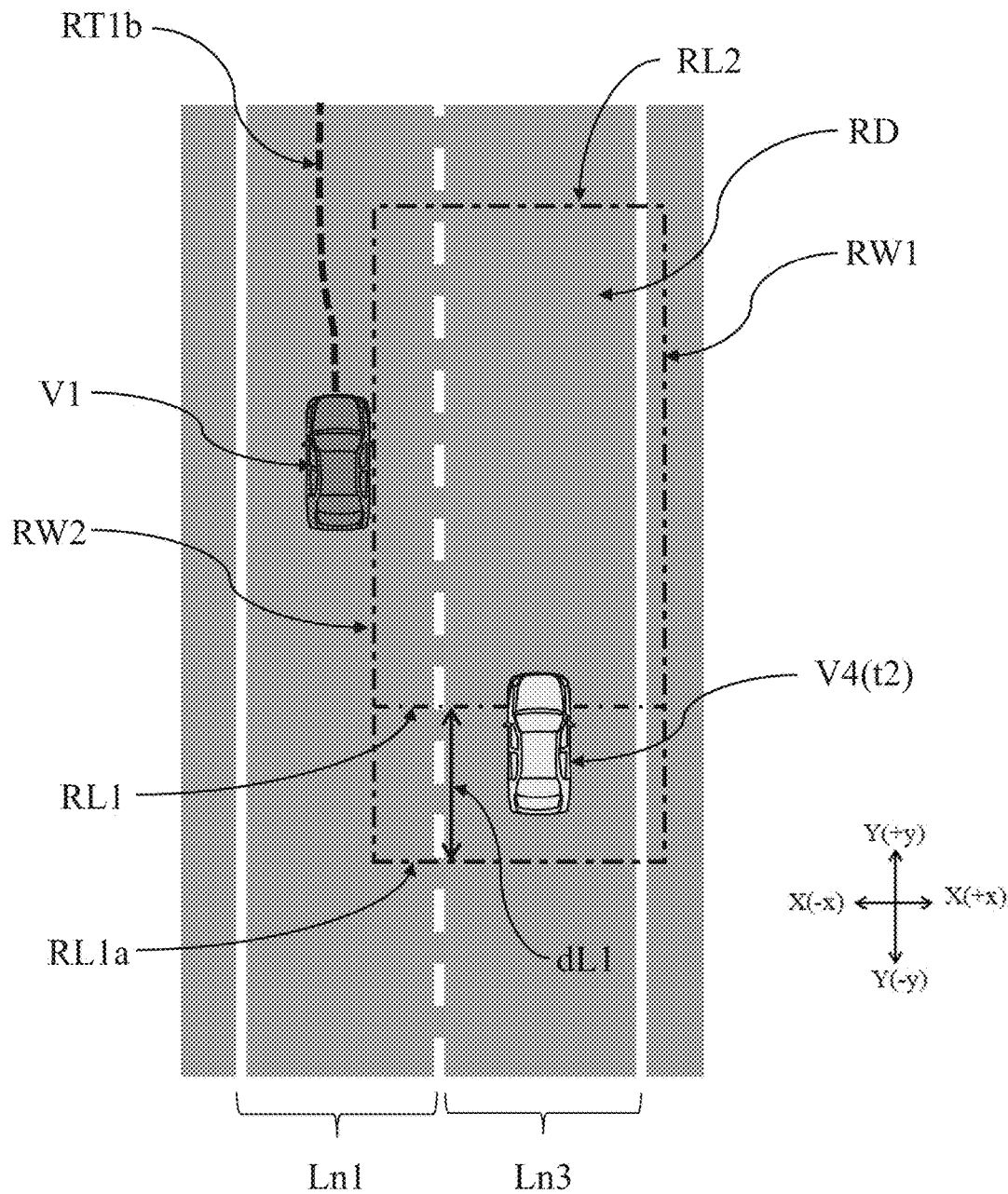
FIG. 3B is a plan view for describing an example of a process to extend the detection area.

When having set the detection area RD as illustrated in FIG. 3A, the control device 10 according to one or more embodiments of the present invention adjusts the target route RT1a thereby to plan a new target route RT1b upon detection that the other vehicle V4 enters the detection area RD from behind the subject vehicle V1 as illustrated by V4(t2) while the control device 10 controls the subject vehicle V1 to travel on the target route RT1a. That is, when the entry of the other vehicle V4 into the detection area RD is detected, the control device 10 determines that the other vehicle V4 is approaching the subject vehicle V1, and plans the new target route RT1b in order for the subject vehicle V1 to deviate from the other vehicle V4 for the purposes of enhancing the safety, giving a sense of security to the passengers of the subject vehicle V1, and the like. Specifically, as illustrated in FIG. 3B, the control device 10 adjusts the lateral location (location in the X-axis direction) of the target route RT1a to a location deviated from the other vehicle V4 (location in −x direction in the scene illustrated in FIG. 3A) to plan a new target route RT1b.

Here, the adjustment width dW1 of the lateral location of the target route RT1a (distance in the X-axis direction between the target route RT1a and the target route RT1b illustrated in FIG. 3A) may be a distance that allows the subject vehicle V1 to moderately deviate from the other vehicle. For example, the higher the speed of the other vehicle V4 or the relative speed of the other vehicle V4 to the subject vehicle V1 is, the larger the adjustment width dW1 is set. In addition or alternatively, the adjustment width dW1 may be set larger as the vehicle width of the other vehicle V4 increases. In addition or alternatively, the adjustment width dW1 may be set larger as the other vehicle V4 comes close to the subject vehicle V1 along the X-axis direction and/or as the other vehicle V4 deviates toward the subject vehicle V1 in the adjacent lane Ln3.

Figure 3C:
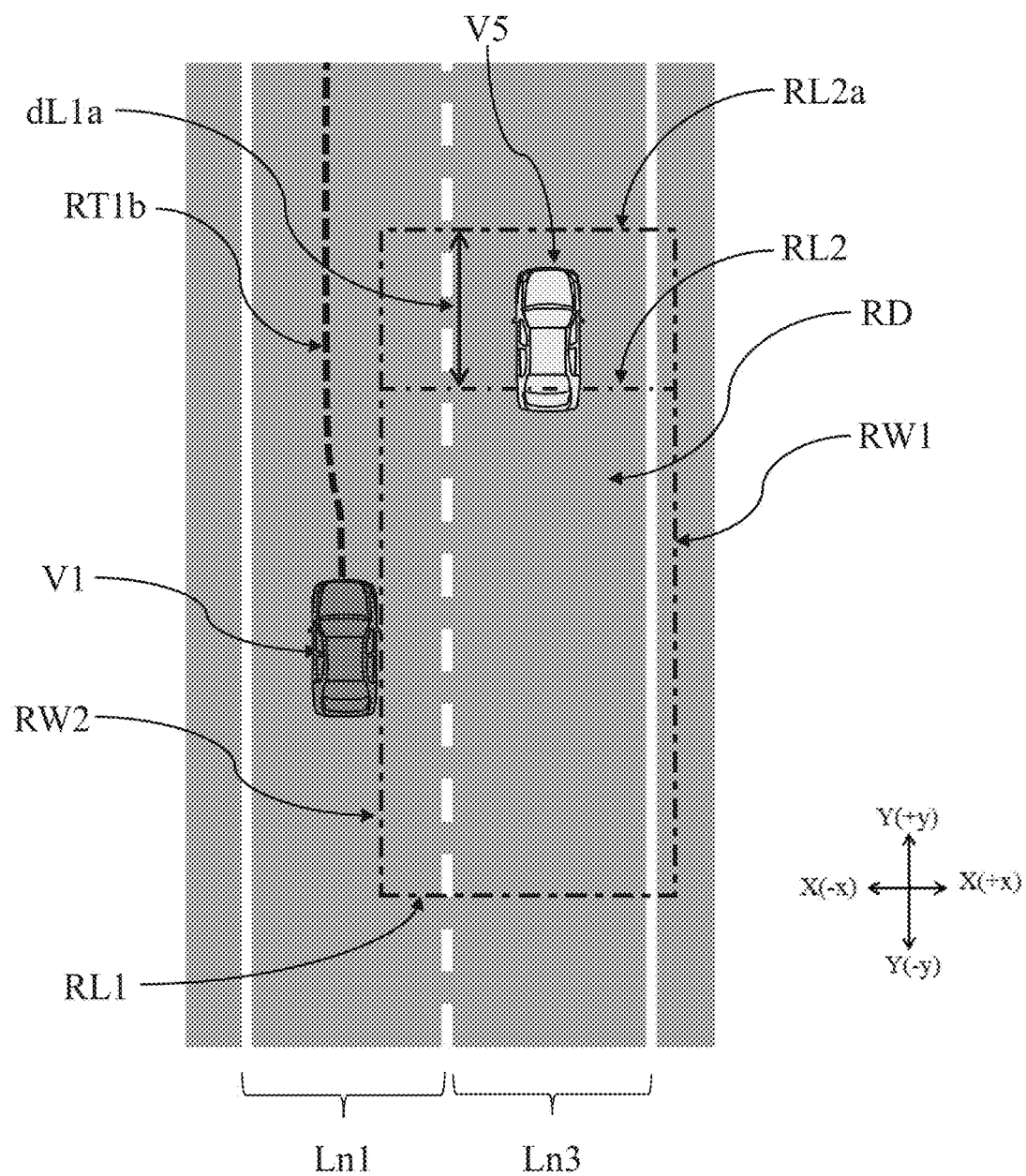
FIG. 3C is a plan view for describing another example of a process to extend the detection area.

Similarly, also when it is detected that another vehicle V5 enters the detection area RD from ahead of the subject vehicle V1 as illustrated in FIG. 3C, the control device 10 according to one or more embodiments of the present invention adjusts the target route RT1a to plan a new target route RT1b.

The control device 10 according to one or more embodiments of the present invention controls the subject vehicle V1 to travel on the target route RT1b while the other vehicle V4 exists within the detection area RD.

In one or more embodiments of the present invention, when it is detected that the other vehicle V4 enters the detection area RD from behind the subject vehicle V1 as illustrated by V4(t2) in FIG. 3B, the control device 10 extends the detection area RD rearward from the subject vehicle V1. Specifically, the control device 10 sets the first end part RL1 of the detection area RD to a first end part RL1a located further behind the subject vehicle V1 (−y direction) thereby to extend the detection area RD rearward from the subject vehicle V1. In addition, when it is detected that another vehicle V5 enters the detection area RD from ahead of the subject vehicle V1 as illustrated in FIG. 3C, the control device 10 according to one or more embodiments of the present invention sets the second end part RL2 of the detection area RD to a second end part RL2a located further ahead of the subject vehicle V1 (+y direction) thereby to extend the detection area RD frontward from the subject vehicle V1. According to one or more embodiments of the present invention, the detection area RD is extended rearward or frontward from the subject vehicle V1 in accordance with the position of the avoidance object relative to the subject vehicle V1 in the above manner and the hunting in the control can thereby be suppressed when the control device 10 controls the travel of the subject vehicle V1.

This will be more specifically described. If the size and location of the detection area RD for detecting an avoidance object such as other vehicles V4 and V5 are fixed (unchangeable/confirmed), the distances between the subject vehicle V1 and the other vehicles V4 and V5 vary when the subject vehicle V1 and/or the other vehicles V4 and V5 are slightly accelerated or decelerated, and the other vehicles V4 and V5 may repeat entry into the detection area RD and exit from the detection area RD. In this case, every time the other vehicles V4 and V5 enter the detection area RD, the target route RT1a is re-planned (i.e., the travel position of the subject vehicle V1 is adjusted), while every time the other vehicles V4 and V5 exit the detection area RD, adjustment is performed to recover the travel position of the subject vehicle V1 in place. This may possibly cause the occurrence of hunting in the control for adjusting the travel position of the subject vehicle V1.

To eliminate such hunting in the control, according to one or more embodiments of the present invention, when it is detected that the other vehicle V4 enters the detection area RD from behind the subject vehicle V1, the detection area RD is extended rearward from the subject vehicle V1 as illustrated in FIG. 3B, and when it is detected that the other vehicle V5 enters the detection area RD from ahead of the subject vehicle V1, the detection area RD is extended frontward from the subject vehicle V1 as illustrated in FIG. 3C. This operation can suppress the occurrence of the above-described hunting while the other vehicle V4 exists around the subject vehicle V1.

The extension lengths dL1 (distance between the first end part RL1 and the first end part RL1a illustrated in FIG. 3B) and dL1a (distance between the second end part RL2 and the second end part RL2a illustrated in FIG. 3C) of the detection area RD may be appropriately set within a range in which the occurrence of the above-described hunting can be suppressed. For example, when the control device 10 can acquire information on the entire length of the other vehicle V4 using the above-described detection device 50 of the onboard apparatus 200 or the like, the extension lengths dL1 and dL1a are set longer than the entire length of the other vehicle V4.

In addition or alternatively, the extension lengths dL1 and dL1a of the detection area RD may be set longer as the speed or acceleration of the subject vehicle V1 increases. In addition or alternatively, the extension lengths dL1 and dL1a of the detection area RD may be set longer as the time for the subject vehicle V1 to accelerate increases. The reasons are as follows. When the speed or acceleration of the subject vehicle V1 is large or when the time for the subject vehicle V1 to accelerate is long, the relative speed of the subject vehicle V1 to the other vehicle V4 tends to be high. In such cases, if the extension lengths dL1 and dL1a of the detection area RD are short, the other vehicle V4 once having entered the detection area RD exits the detection area RD in a moment, which may cause the occurrence of hunting in the control for the subject vehicle V1. Accordingly, the lager the speed or acceleration of the subject vehicle V1 is, and the longer the time for the subject vehicle V1 to accelerate is, the longer the extension lengths dL1 and dL1a of the detection area RD are set, and the hunting can thereby be more effectively suppressed.

In addition or alternatively, when extending the detection area RD, the control device 10 according to one or more embodiments of the present invention may be triggered to extend the detection area RD by detection of a predetermined number or more of entry and exit of the other vehicle to/from the detection area RD within a predetermined time period. This will be more specifically described. Even when the other vehicle V4 enters the detection area RD from behind the subject vehicle V1 as illustrated in FIG. 3B, the above-described hunting does not occur in a scene in which the other vehicle V4 directly passes by the subject vehicle V1 or a scene in which the other vehicle V4 decelerates or the subject vehicle V1 accelerates so that the distance between the other vehicle V4 and the subject vehicle V1 increases. Similarly, even when the other vehicle V5 enters the detection area RD from ahead of the subject vehicle V1 as illustrated in FIG. 3C, the above-described hunting does not occur in a scene in which the subject vehicle V1 directly passes by the other vehicle V5 or a scene in which the other vehicle V5 accelerates or the subject vehicle V1 decelerates so that the distance between the other vehicle V5 and the subject vehicle V1 increases. Thus, when a predetermined number or more of the entry, exit and reentry of the other vehicles V4 and V5 to/from the detection area RD are detected and the above-described hunting starts to occur or when the hunting is highly likely to occur, the detection area RD is extended and the hunting can thereby be more appropriately suppressed.

The above-described predetermined time period can be, but is not limited to being, about 30 seconds to 3 minutes. The predetermined number may preferably be about twice to four times because if an unduly large number is set, the hunting may occur before the detection area RD is extended.

In addition or alternatively, when, as illustrated in FIG. 4A, another vehicle V6 exists further behind the other vehicle V4 which exists behind the subject vehicle V1, the control device 10 according to one or more embodiments of the present invention may adjust the size of the detection area RD in accordance with the position of the other vehicle V6 to suppress the hunting due to the other vehicle V6, that is, the hunting caused by the repetition of entry and exit of the other vehicle V6 to/from the detection area RD. For example, provided that the first end part RL1 of the detection area RD has been set, as illustrated in FIG. 4A, to a first end part RL1a located further behind the subject vehicle V1 (−y direction) due to the entry of the other vehicle V4 thereby to extend the detection area RD, when the other vehicle V6 exists at the position of the first end part RL1a, the position of the first end part RL1 is changed from the first end part RL1a to a first end part RL1b to contract the detection area RD. The contraction length dL2 of the detection area RD may be appropriately set in accordance with the distance between the subject vehicle V1 and the other vehicle V6 along the Y-axis direction within a range in which the hunting due to the other vehicle V6 does not occur.

Figure 4B:
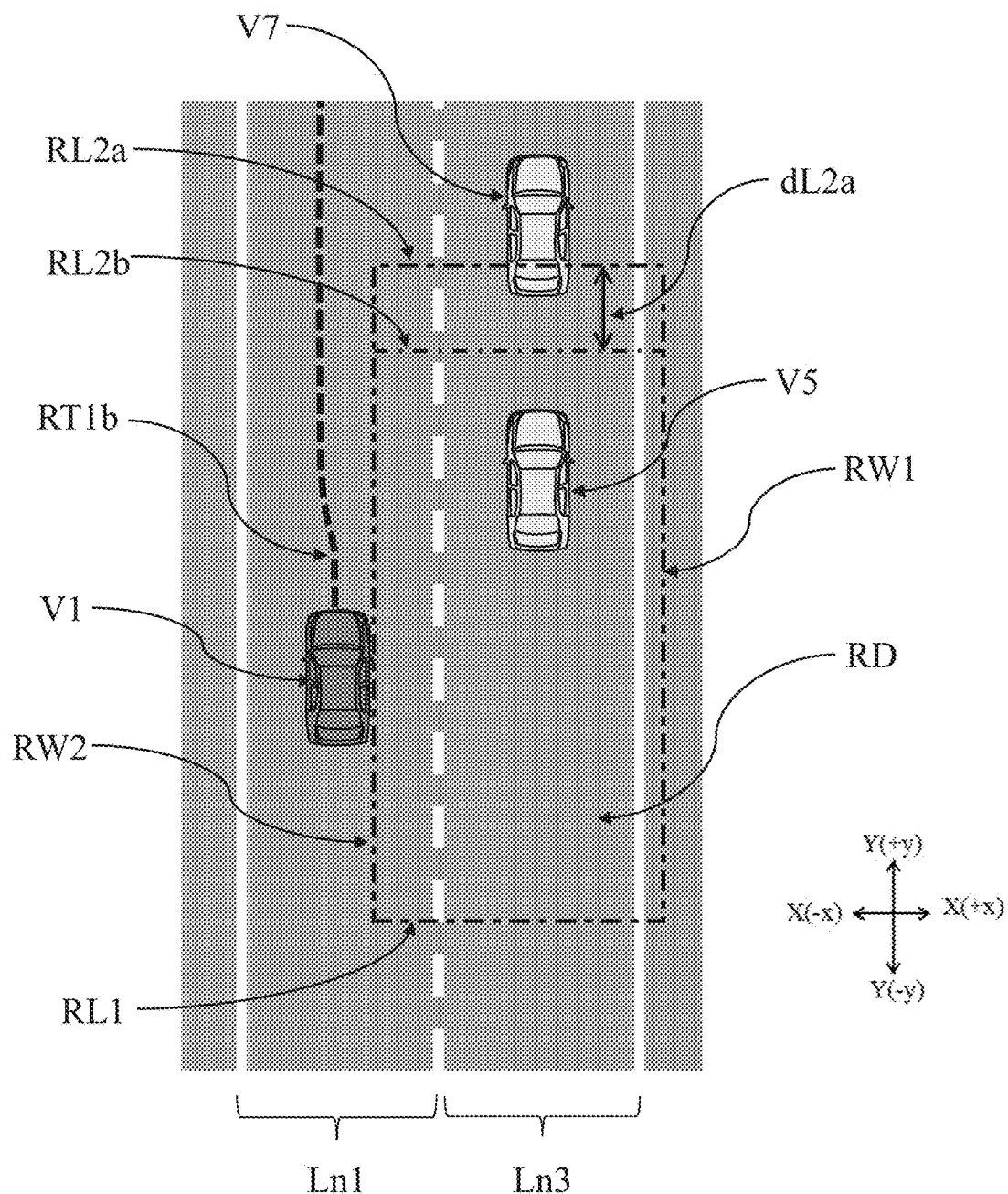
FIG. 4B is a plan view for describing a process to contract the detection area when another avoidance object exists further ahead of the avoidance object existing ahead of the subject vehicle.

Similarly, also when, as illustrated in FIG. 4B, another vehicle V7 exists further ahead of the other vehicle V5 which exists ahead of the subject vehicle V1, the control device 10 according to one or more embodiments of the present invention may adjust the size of the detection area RD in accordance with the position of the other vehicle V7 to suppress the hunting caused by the repetition of entry and exit of the other vehicle V7 to/from the detection area RD. For example, provided that the second end part RL2 of the detection area RD has been set, as illustrated in FIG. 4B, to a second end part RL2*a* located further ahead of the subject vehicle V1 (+y direction) due to the entry of the other vehicle V5 thereby to extend the detection area RD, when the other vehicle V7 exists at the position of the second end part RL2*a*, the position of the second end part RL2 is changed from the second end part RL2*a* to a second end part RL2*b* to contract the detection area RD. The contraction length dL2*a* of the detection area RD may be appropriately set in accordance with the distance between the subject vehicle V1 and the other vehicle V7 along the Y-axis direction within a range in which the hunting due to the other vehicle V7 does not occur.

In one or more embodiments of the present invention, the control device 10 recovers the detection area RD, which is extended as described above due to the existence of an avoidance object within the detection area RD, to the original size at a predetermined timing. For example, the control device 10 recovers the detection area RD, which is extended as illustrated in FIG. 3B by changing the first end part RL1 to the position of the first end part RL1*a*, to the original size by recovering the first end part RL1*a* to the position of the first end part RL1 after a predetermined time passes from the time point of the extension.

In addition or alternatively, when the control device 10 according to one or more embodiments of the present invention can acquire the identification information (e.g. unique information of the vehicle, such as a license plate) of the other vehicle V4 which enters the detection area RD, such as using the detection device 50 of the onboard apparatus 200, the control device 10 may maintain the state of the extended detection area RD while the other vehicle V4 exists within the detection area RD and may recover the detection area RD to the original size when the existence of the other vehicle V4 is no longer detected within the detection area RD. In an alternative embodiment, the subject vehicle V1 may acquire the identification information of the other vehicle V4 from the other vehicle V4 via inter-vehicle communication.

When the detection area RD is recovered to the original size, the extended detection area RD may be contracted little by little to gradually recover its original size or may also be recovered to the original size at once at a predetermined timing.

According to one or more embodiments of the present invention, the control device 10 uses the route planning function to plan and set a target route RT1 in the above manner. In addition, the control device 10 sets a detection area RD for detecting an avoidance object around the subject vehicle V1 and, when other vehicles V4 and V5 enter the detection area RD, the control device 10 extends the detection area RD and adjusts the target route RT1.

In the above-described examples illustrated in FIG. 3A to FIG. 3C, FIG. 4A and FIG. 4B, the detection area RD is set at the right side of the subject vehicle V1, but the location of the detection area RD is not particularly limited and the detection area RD may also be set at the left side of the subject vehicle V1 or behind the subject vehicle V1. Also in such settings, the control device 10 extends the detection area RD as the above when it is detected that an avoidance object exists within the detection area RD.

Next, the control function of the control device 10 will be described. The control function is used to output command information for driving the subject vehicle V1 on the target route RT1 to the vehicle controller 70, driving device 80, and steering device 90.

Acquiring the command information from the control device 10, the vehicle controller 70 controls the driving device 80 and steering device 90 to drive the subject vehicle V1 along the target route RT1. The vehicle controller 70 performs control of the steering device 90 such that the subject vehicle travels while maintaining a lateral position to the lane, using the road shape detected by the detection device 50, the road information 122 from the navigation device 120, and a lane marker model stored in the map information 123. The vehicle controller 70 calculates a steering control amount on the basis of the steering angle acquired from the steering angle sensor 61, the vehicle speed acquired from the vehicle speed sensor 62, and information on the current for a steering actuator and sends a current command to the steering actuator to perform the control such that the subject vehicle travels at a target lateral position. The method of controlling the lateral position of the subject vehicle V1 is not limited to using the above-described steering device 90. In addition or alternatively, the driving device 80 and/or the braking device 81 may be used to control the travel direction (i.e. lateral position) of the subject vehicle V1 on the basis of the rotational speed difference between the right and left drive wheels. In this sense, the "turning" of a vehicle is intended to encompass the cases of using the driving device 80 and/or the braking device 81 in addition to the cases of using the steering device 90.

Thus, in one or more embodiments of the present invention, when an avoidance object is detected, a target route RT1 is calculated so as to pass by the avoidance object. Then, the travel control is performed such that the subject vehicle V1 travels along the target route RT1. Moreover, in one or more embodiments of the present invention, detection of an avoidance object, calculation of the target route RT1, and travel control based on the target route RT1 are repeatedly performed at regular intervals. This allows the control device 10 to sequentially plan the target route RT1 for the subject vehicle V1 on the basis of the updated surrounding situations around the subject vehicle V1. The subject vehicle V1 can therefore travel on a route suitable for the surrounding situations around the subject vehicle V1.

Finally, the presentation function of the control device 10 according to one or more embodiments of the present invention will be described. The control device 10 sends information in accordance with the position of an avoidance object, information in accordance with the location of a detection area RD which will be described later, and information regarding the travel control for the subject vehicle V1 by the travel control device 100 to the output device 110, which then outputs them to the external in the above-described form.

A travel control process according to one or more embodiments of the present invention will then be described with reference to the flowcharts of FIG. 5 and FIG. 6. The contents of the process in each step are as described above and the flow of the process will be mainly described below.

First, the procedure of the travel control as a whole will be described with reference to FIG. 5. Here, an exemplary scene will be described in which, as illustrated in FIG. 3A, etc., the control device 10 automatically controls the travel of the subject vehicle V1 in a state of setting the detection area RD at the right side of the subject vehicle V1. In one or more embodiments of the present invention, the travel control process illustrated in FIG. 5 is repeatedly executed at regular intervals.

In step S101, the control device 10 acquires subject vehicle information that includes at least the position of the subject vehicle V1. The subject vehicle information may further include the vehicle speed and/or acceleration of the subject vehicle V1. In step S102, the control device 10 acquires, from the detection device 50, object information that includes the position of an avoidance object which the subject vehicle V1 should avoid. The object information may further include the speed and/or acceleration of the avoidance object.

In step S103, the control device 10 acquires the detection result of an avoidance object from the detection device 50. The detection result of an avoidance object includes information on the position of the avoidance object. In step S104, the control device 10 sets an object area R in accordance with the position of the avoidance object.

In step S105, the control device 10 calculates target coordinates and a target route RT1 for passing by the object area R. The target route RT1 includes one or more target coordinates at which the subject vehicle V1 is to travel. Each target coordinate includes a target lateral position (target X-coordinate) and a target longitudinal position (target Y-direction). The control device 10 obtains the target route RT1 by connecting the calculated one or more target coordinates and the current position of the subject vehicle V1. Step S104 for the process of setting the object area R may be skipped and the routine may proceed from step S103 to step S105 for the process of calculating the target coordinate or coordinates. In this case, the control device 10 calculates the target coordinate or coordinates and the target route RT1 on the basis of the position of the avoidance object so as to pass by the avoidance object. A method of calculating the target coordinate or coordinates in step S105 will be described later.

In step S106, the control device 10 acquires the target lateral position or positions of the target coordinate or coordinates calculated in step S105. In step S107, the control device 10 compares the current lateral position of the subject vehicle V1 with the target lateral position or positions acquired in step S106 and calculates a feedback gain for the lateral position on the basis of the comparison result.

In step S108, the control device 10 calculates a target control value on the basis of the actual lateral position of the subject vehicle V1, the target lateral position corresponding to the current position, and the feedback gain of step S107. The target control value relates to a steering angle, steering angular velocity and other necessary parameters for moving the subject vehicle V1 onto the target lateral position. Then, in step S112, the control device 10 outputs the calculated target control value to the onboard apparatus 200. This allows the subject vehicle V1 to travel on the target route RT which is defined by the target lateral position. When a plurality of target coordinates is calculated in step S105, the process of steps S106 to S112 are repeated every time the target lateral position is acquired, and the target control value for each target lateral position acquired is output to the onboard apparatus 200.

In step S109, the control device 10 acquires the target longitudinal position or positions of the one or more target coordinates calculated in step S105. In step S110, the control device 10 compares the current longitudinal position and the vehicle speed and acceleration at the current position of the subject vehicle V1 with the target longitudinal position corresponding to the current longitudinal position and the vehicle speed and acceleration at the target longitudinal position and calculates a feedback gain for the longitudinal position on the basis of the comparison result. In step S111, the control device 10 calculates a target control value for the longitudinal position on the basis of the vehicle speed and acceleration corresponding to the target longitudinal position and the feedback gain for the longitudinal position calculated in step S110. As in the previously-described steps S106 to S108 and S112, the process of steps S109 to S112 are repeated every time the target longitudinal position is acquired, and the target control value for each target longitudinal position acquired is output to the onboard apparatus 200.

Here, the target control value for the longitudinal position (in the longitudinal direction) refers to a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed corresponding to the target longitudinal position. For example, in an engine car, the control function is used to calculate a target amount of intake air (target opening degree of the throttle valve) and a target amount of fuel injection on the basis of calculated values of the current and target acceleration, deceleration and vehicle speed and send them to the driving device 80. Alternatively, the control function may be used to calculate the acceleration, deceleration and vehicle speed and send them to the vehicle controller 70, which may calculate a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve these acceleration, deceleration and vehicle speed.

The routine then proceeds to step S112 in which the control device 10 outputs the target control value for the longitudinal position (in the longitudinal direction) calculated in step S111 to the onboard apparatus 200. The vehicle controller 70 executes the steering control and drive control to operate the subject vehicle to travel on the target route RT which is defined by the target lateral position and target longitudinal position.

In step S113, the control device 10 controls the output device 110 to present information. The information presented by the output device 110 may be the information on the object area R calculated in step S104, the shape of target route RT1 calculated in step S105, and/or the target control value output to the onboard apparatus 200 in step S112.

In step S114, the control device 10 determines whether the driver intervenes in the operation, such as whether the driver performs the steering operation. When the operation by the driver is not detected, the routine returns to step S101, from which the setting of a new object area R, calculation of a target route, and travel control are repeated. On the other hand, when the operation by the driver is detected, the routine proceeds to step S115, in which the travel control is suspended. Step S115 is followed by step S116, in which presentation of information is made that the travel control is suspended.

Figure 6:
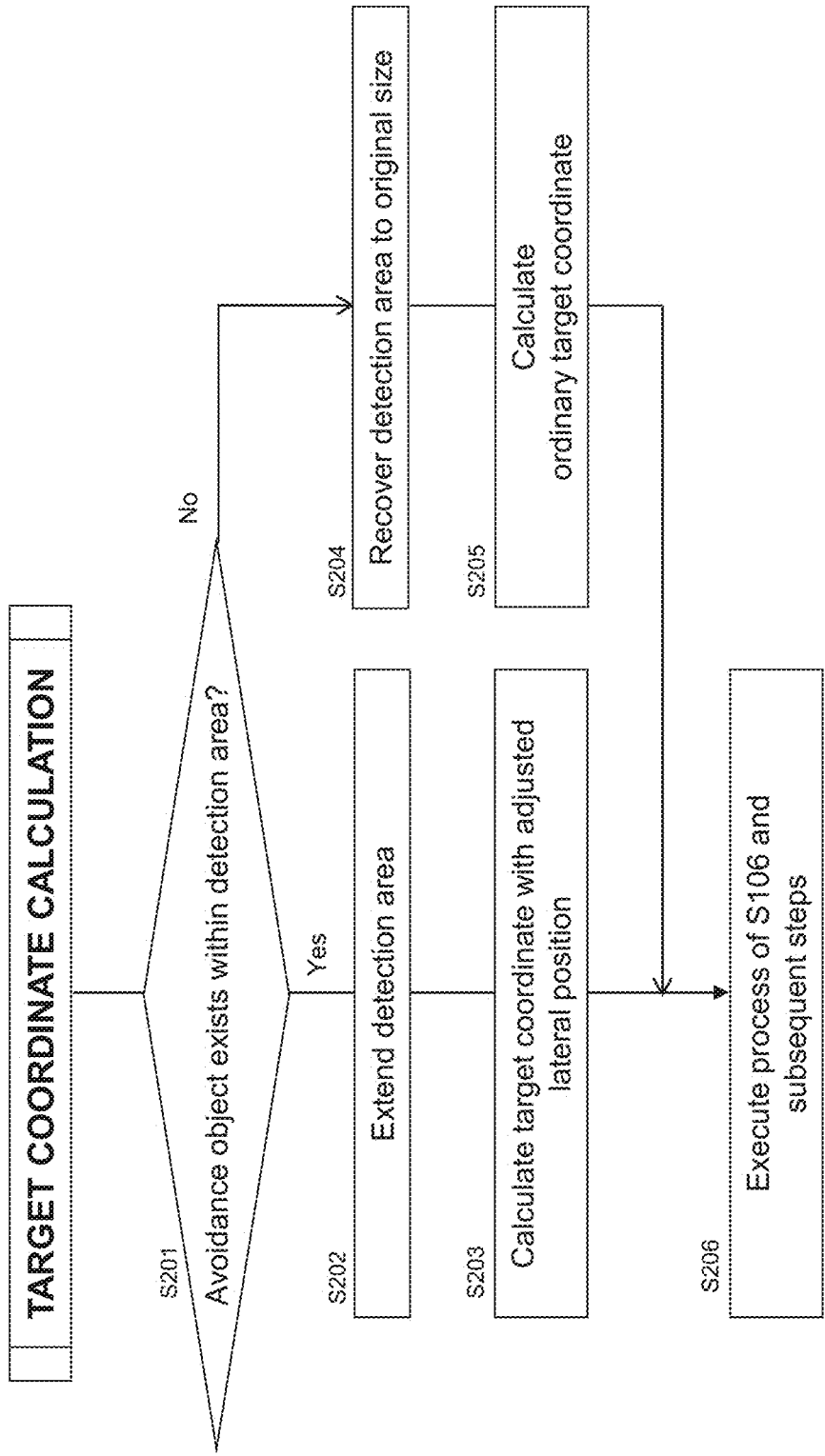
FIG. 6 is a flowchart illustrating a subroutine of step S105 of FIG. 5.

Referring now to the flowchart of FIG. 6, a target coordinate calculation process of step S105 is illustrated. This process will be described below.

First, in step S201, the control device 10 determines whether or not an avoidance object exists within the detection area RD which is preliminarily set. Specifically, the control device 10 determines whether or not an avoidance object exists within the detection area RD, on the basis of the positional information of the avoidance object acquired from the detection device 50 in step S103 of FIG. 5. When, in step S201, a determination is made that an avoidance object exists within the detection area RD, the routine proceeds to step S202. When, in step S201, a determination is made that an avoidance object does not exist within the detection area RD, the routine proceeds to step S204.

When, in step S201, a determination is made that an avoidance object exists within the detection area RD, the routine proceeds to step S202, in which the control device 10 extends the detection area RD set at the right side of the subject vehicle V1 rearward or frontward from the subject vehicle V1, as illustrated in FIG. 3B and FIG. 3C. More specifically, when a determination can be made that an avoidance object enters the detection area RD from behind the subject vehicle V1, the control device 10 extends the detection area RD rearward from the subject vehicle V1, as illustrated in FIG. 3B. When, on the other hand, a determination can be made that an avoidance object enters the detection area RD from ahead of the subject vehicle V1, the control device 10 extends the detection area RD frontward from the subject vehicle V1, as illustrated in FIG. 3C. In this operation, the lager the speed or acceleration of the subject vehicle V1 is, and the longer the time for the subject vehicle V1 to accelerate is, the longer the control device 10 sets the extension lengths dL1 and dL1a of the detection area RD on the basis of the object information acquired in step S102 of FIG. 5.

In step S203, the control device 10 calculates target coordinates that correspond to the case in which an avoidance object exists within the detection area RD. Specifically, the control device 10 calculates target coordinates for planning a target route that allows the subject vehicle V1 to deviate from the avoidance object to travel, like the target route RT1b illustrated in FIG. 3A to FIG. 4B.

Step S205 is followed by step S206 in which the control device 10 executes the process of step S106 and subsequent steps.

When, on the other hand, a determination is made in step S201 that an avoidance object does not exist within the detection area RD, the routine proceeds to step S204, in which the control device 10 recovers the detection area RD to the original size when the detection area RD has been extended. This is because, in one or more embodiments of the present invention, the travel control process illustrated in FIG. 5 is repeatedly executed at regular intervals as described above. That is, when the detection area RD has been extended in step S202 of FIG. 6 in the previous process and the routine proceeds step S204, the extended detection area RD is recovered to the original size.

In step S205, the control device 10 calculates target coordinates that correspond to the case in which an avoidance object does not exist within the detection area RD. Specifically, the control device 10 calculates target coordinates for planning a target route that allows the subject vehicle V1 to travel near the center line of the travel lane Ln1, like the target route RT1a illustrated in FIG. 3A.

The travel control device 100 according to one or more embodiments of the present invention is configured and operates as the above and therefore has the following effects.

(1) According to the travel control device 100 in one or more embodiments of the present invention, at least one of the following processes is executed: a process in which, when it is detected that an avoidance object located behind the subject vehicle V1 exists within the detection area RD, the travel of the subject vehicle V1 is controlled in response to the detection and the initially-set detection area RD is extended rearward from the subject vehicle; and a process in which, when it is detected that an avoidance object located ahead of the subject vehicle V1 exists within the detection area RD, the travel of the subject vehicle V1 is controlled in response to the detection and the initially-set detection area RD is extended frontward from the subject vehicle. This can suppress the repetition of entry and exit of the avoidance object to/from the initially-set detection area RD. Consequently, the hunting in travel control for the subject vehicle V1 is suppressed while the avoidance object exists around the subject vehicle V1, and the uncomfortable feeling given to the passengers of the subject vehicle V1 can be mitigated.

(2) According to the travel control device 100 in one or more embodiments of the present invention, upon detection of a predetermined number or more of entry and exit of the avoidance object to/from the detection area RD within a predetermined time period, the detection area RD is extended rearward from the subject vehicle V1 when the avoidance object is located behind the subject vehicle V1, and the detection area RD is extended frontward from the subject vehicle V1 when the avoidance object is located ahead of the subject vehicle V1. Through this operation, when the hunting actually starts to occur or when the hunting is highly likely to occur, the detection area RD is extended and the hunting can be more appropriately suppressed.

(3) According to the travel control device 100 in one or more embodiments of the present invention, when the avoidance object located behind the subject vehicle V1 exists within the detection area RD, the detection area RD is extended rearward from the subject vehicle V1 and maintained with its extended state for a predetermined time period, and thereafter the extended detection area RD is contracted toward the subject vehicle V1. In addition or alternatively, when the avoidance object located ahead of the subject vehicle V1 exists within the detection area RD, the travel control device 100 extends the detection area RD frontward from the subject vehicle V1 and maintains the detection area RD with its extended state for a predetermined time period, thereafter contracting the extended detection area RD toward the subject vehicle V1. The detection area RD is therefore contracted at the timing at which a time period passes after the avoidance object and the subject vehicle V1 come close to each other and it is thus expected that the distance between the avoidance object and the subject vehicle V1 increases sufficiently. Consequently, the travel control for the subject vehicle V1 can be more appropriately performed.

(4) According to the travel control device 100 in one or more embodiments of the present invention, an avoidance object existing within the detection area RD is specified and the extended state of the detection area RD is maintained while the specified avoidance object exists within the detection area RD. The extended detection area RD is contracted when it is detected that the avoidance object does not exist (no longer exists) within the extended detection area. Thus, the detection area RD is extended only while the avoidance object and the subject vehicle V1 are close to each other, and the travel control for the subject vehicle V1 can be more appropriately performed.

(5) According to the travel control device 100 in one or more embodiments of the present invention, the extension lengths dL1 and dL1a of the detection area RD are adjusted in accordance with the speed of the subject vehicle V1, the acceleration of the subject vehicle V1, and/or the time for the subject vehicle V1 to accelerate. The hunting can therefore be appropriately suppressed in accordance with the travel state of the subject vehicle V1 because the higher the relative speed between the subject vehicle V1 and the avoidance object is, the longer the extension lengths dL1 and dL1a of the detection area RD are.

(6) According to the travel control device 100 in one or more embodiments of the present invention, when the detection area RD is extended rearward from the subject vehicle V1 as described above, the detection area RD extended due to the first avoidance object existing within the detection area RD is contracted toward the subject vehicle V1 upon a second avoidance object existing further behind the first avoidance object located behind the subject vehicle V1. In addition or alternatively, when the detection area RD is extended frontward from the subject vehicle V1 as described above, the travel control device 100 contracts the detection area RD, which is extended due to the first avoidance object existing within the detection area RD, toward the subject vehicle V1 upon a second avoidance object existing further ahead of the first avoidance object located ahead of the subject vehicle V1. This operation prevents the repetition of entry and exit of the second avoidance object to/from the detection area RD and can thus suppress the hunting due to the second avoidance object.

(7) According to the travel control device 100 in one or more embodiments of the present invention, when it is detected that the above second avoidance object exists within the detection area RT which is extended due to the above first avoidance object existing within the detection area RD, the detection area RD is contracted so that the second avoidance object falls outside the detection area RD. This operation can more appropriately prevent the repetition of entry and exit of the second avoidance object to/from the detection area RD and the hunting due to the second avoidance object can thus be more effectively suppressed.

(8) According to the travel control device 100 in one or more embodiments of the present invention, one or more information items among information in accordance with the position of the avoidance object, information in accordance with the location of the detection area RD, and information regarding the travel control for the subject vehicle V1 by the travel control device 100 are output to external, and the passengers of the subject vehicle and/or other vehicles can thereby be preliminarily informed of the behavior of the subject vehicle. This allows the passengers of the subject vehicle and/or other vehicles to respond to the behavior of the subject vehicle.

(9) When the travel control method according to one or more embodiments of the present invention is executed by the control device 10, the same action and effect can be obtained as in the above travel control device 100.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the present description, one or more embodiments of the travel control device according to the present invention are described by exemplifying the travel control device 100 which, together with the onboard apparatus 200, constitutes the travel control system 1, but the present invention is not limited to this.

In the above description, examples are described in which the travel position (target route RT1b) of the subject vehicle V1 is adjusted when another vehicle V4 exists within the detection area RD. In one or more embodiments of the present invention, the travel position of the subject vehicle V1 may also be adjusted in the following manner.

For example, first, at the time point at which it is first detected that another vehicle V4 enters the detection area RD, the control device 10 changes the target route from the target route RT1a to the target route RT1b as illustrated in FIG. 3A so as to drive the subject vehicle V1 at a position separate from the other vehicle V4, without extending the detection area RD. Then, when the other vehicle V4 exits the detection area RD, the control device 10 extends the detection area RD as illustrated in FIG. 3B after a predetermined time period passes from the exit of the other vehicle V4 (e.g. 5 to 10 seconds later). In this operation, when the other vehicle V4 exists within the range of the extended detection area RD, the control device 10 continues to control the subject vehicle V1 to travel on the target route RT1b, while on the other hand, when the other vehicle V4 does not exist within the range of the extended detection area RD, the control device 10 determines that the other vehicle V4 comes away sufficiently from the subject vehicle V1, and recovers the target route to the target route RT1 so that the subject vehicle V1 travels near the center of the travel lane Ln1.

In the present description, the travel control device 100 comprising the control device 10 which executes the subject vehicle information acquisition function, object information acquisition function, detection area setting function, route planning function and control function is described as one example of a travel control device comprising a first information acquisition unit, second information acquisition unit, setting unit, control unit and output unit, but the present invention is not limited to this. In the present description, the travel control device 100 further comprising the output devices 30 and 110 is described as one example of a travel control device further comprising an output unit, but the present invention is not limited to this.

| Description of Reference Numerals | |
|---|---|
| 1 | Travel control system |
| 100 | Travel control device |
| 10 | Control device |
| 20 | Communication device |
| 30 | Output device |
| 31 | Display |
| 32 | Speaker |
| 200 | Onboard apparatus |
| 40 | Communication device |
| 50 | Detection device |
| 60 | Sensor |
| 70 | Vehicle controller |
| 80 | Driving device |
| 90 | Steering device |
| 110 | Output device |
| 120 | Navigation device |
| R | Object area |
| RD | Detection area |
| V1 | Subject vehicle |
| V2 to V7 | Another vehicle (Avoidance object) |

The invention claimed is:

1. A travel control device comprising:
a first information acquisition unit configured to acquire subject vehicle information including a position of a subject vehicle;
a second information acquisition unit configured to acquire object information including a position of a first avoidance object which the subject vehicle should avoid;

a setting unit configured to set a detection area for detecting the first avoidance object, the detection area being set in accordance with the position of the subject vehicle;

a detection unit configured to determine whether or not the first avoidance object exists within the detection area; and a control unit configured to output command information for controlling travel of the subject vehicle when it is detected that the first avoidance object exists within the detection area, the setting unit being further configured to execute a first process to extend the detection area rearward from the subject vehicle when it is detected that the first avoidance object located behind the subject vehicle enters the detection area from behind the subject vehicle and exists within the detection area.

2. The travel control device according to claim 1, wherein, upon detection of a predetermined number or more of entry and exit of the first avoidance object to/from the detection area within a predetermined time period, the setting unit executes the first process.

3. The travel control device according to claim 1, wherein the setting unit, when having executed the first process, maintains a state of the detection area extended rearward from the subject vehicle for a predetermined time period and thereafter contracts an extended detection area toward subject vehicle.

4. The travel control device according to claim 1, wherein the setting unit specifies the first avoidance object existing within the detection area and maintains an extended state of the detection area while a specified first avoidance object exists within the detection area, and thereafter contracts an extended detection area when it is detected that the first avoidance object does not exist within the extended detection area.

5. The travel control device according to claim 1, wherein the setting unit increases a distance to extend the detection area as a speed of the subject vehicle increases.

6. The travel control device according to claim 1, wherein the setting unit increases a distance to extend the detection area as a time for the subject vehicle to accelerate increases.

7. The travel control device according to claim 1, wherein the setting unit increases a distance to extend the detection area as an acceleration of the subject vehicle increases.

8. The travel control device according to claim 1, wherein the setting unit, when having executed the first process, contracts an extended detection area toward the subject vehicle upon a second avoidance object different from the first avoidance object existing further behind the first avoidance object located behind the subject vehicle.

9. The travel control device according to claim 8, wherein, when the detection unit detects that the second avoidance object exists within the extended detection area, the setting unit contracts the extended detection area so that the second avoidance object falls outside the extended detection area.

10. The travel control device according to claim 1, further comprising
an output unit configured to output, to external, one or more information items among information in accordance with the object information, information in accordance with a location of the detection area, and information in accordance with the command information.

11. A travel control method executed by a computer, the computer outputting command information for driving a subject vehicle on a target route, the travel control method comprising:

acquiring object information including a position of an avoidance object which the subject vehicle should avoid;

setting a detection area for detecting the avoidance object, the detection area being set in accordance with the position of the subject vehicle; and executing a first process and outputting command information for controlling travel of the subject vehicle, the first process being a process to extend the detection area rearward from the subject vehicle when it is detected that the avoidance object located behind the subject vehicle enters the detection area from behind the subject vehicle and exists within the detection area.

12. A travel control device comprising:

a first information acquisition unit configured to acquire subject vehicle information including a position of a subject vehicle;

a second information acquisition unit configured to acquire object information including a position of a first avoidance object which the subject vehicle should avoid;

a setting unit configured to set a detection area for detecting the first avoidance object, the detection area being set in accordance with the position of the subject vehicle;

a detection unit configured to determine whether or not the first avoidance object is located in an adjacent lane and exists within the detection area, the adjacent lane being adjacent to a lane in which the subject vehicle travels; and a control unit configured to output command information for controlling travel of the subject vehicle when it is detected that the first avoidance object exists within the detection area, the setting unit being further configured to execute at least one of a first process and a second process, the first process being a process to extend the detection area rearward from the subject vehicle when it is detected that the first avoidance object located behind the subject vehicle enters the detection area from behind the subject vehicle and exists within the detection area, the second process being a process to extend the detection area frontward from the subject vehicle when it is detected that the first avoidance object located ahead of the subject vehicle exists within the detection area, and the setting unit, when having executed the first process, contracting the extended detection area toward the subject vehicle upon a second avoidance object different from the first avoidance object existing further behind the first avoidance object located behind the subject vehicle and, when having executed the second process, contracting the extended detection area toward the subject vehicle upon a second avoidance object different from the first avoidance object existing further ahead of the first avoidance object located ahead of the subject vehicle.

13. The travel control device according to claim 12, wherein, when the detection unit detects that the second avoidance object exists within the extended detection area, the setting unit contracts the extended detection area so that the second avoidance object falls outside the extended detection area.

14. The travel control device according to claim 12, further comprising
an output unit configured to output, to external, one or more information items among information in accordance with the object information, information in accordance with a location of the detection area, and information in accordance with the command information.

* * * * *